United States Patent
Tan et al.

(10) Patent No.: US 10,334,981 B2
(45) Date of Patent: Jul. 2, 2019

(54) METHOD AND DEVICE FOR PREPARING BEVERAGES

(75) Inventors: Jingwei Tan, Shanghai (CN); Eng Cheng Khaw, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1714 days.

(21) Appl. No.: 13/988,514

(22) PCT Filed: Nov. 28, 2011

(86) PCT No.: PCT/IB2011/055317
§ 371 (c)(1),
(2), (4) Date: Aug. 5, 2013

(87) PCT Pub. No.: WO2012/073171
PCT Pub. Date: Jun. 7, 2012

(65) Prior Publication Data
US 2013/0309373 A1    Nov. 21, 2013

(30) Foreign Application Priority Data
Nov. 29, 2010    (WO) ................ PCT/CN2010/001913

(51) Int. Cl.
*A47J 31/40* (2006.01)
*A47J 31/52* (2006.01)

(52) U.S. Cl.
CPC .............. *A47J 31/40* (2013.01); *A47J 31/52* (2013.01)

(58) Field of Classification Search
CPC .................................. A47J 31/40; A47J 31/52
See application file for complete search history.

(56) References Cited

U.S. PATENT DOCUMENTS

| 6,730,201 B1 | 5/2004 | Kuhlman |
| 2004/0009585 A1* | 1/2004 | Venancio ............... B82Y 30/00 435/287.2 |
| 2006/0081653 A1 | 4/2006 | Boland |
| 2006/0278093 A1 | 12/2006 | Biderman |
| 2007/0255623 A1 | 11/2007 | Firer |
| 2007/0288117 A1 | 12/2007 | Iwata |

(Continued)

FOREIGN PATENT DOCUMENTS

| CN | 101836107 A | 9/2010 | |
| EP | 1477094 A1 | 11/2004 | |
| EP | 1901062 A1 * | 3/2008 | ............. G01N 33/02 |

(Continued)

*Primary Examiner* — Steven N Leff

(57) ABSTRACT

The present invention relates to a beverage preparation device (100) including a plurality of storage chambers for storing several ingredients having each a different taste property, a user interface (14) for receiving data representing a user's preferred taste, a taste management unit (10) and a generator (15). The taste management unit (10) includes a memory (11) for storing a reference table which describes the taste property of each ingredient and a processor (12) for determining the dosage of each ingredient to be used according to the reference table and the user's preferred taste. The generator (15) generates beverages from the several ingredients according to the determined dosage. The main advantage of this invention is that the beverage preparation device (100) can provide beverages according to the user's desired taste.

10 Claims, 1 Drawing Sheet

(56) References Cited

U.S. PATENT DOCUMENTS

2009/0212663 A1    8/2009  Fung

FOREIGN PATENT DOCUMENTS

| GB | 2473315 A | * | 3/2011 | ............ A47J 31/401 |
|----|-----------|---|--------|--------------------------|
| JP | 2156856 A | | 6/1990 | |
| JP | 073250031 A | | 5/1994 | |
| JP | 2006024138 A | | 1/2006 | |
| JP | 2006167301 A | | 6/2006 | |
| JP | 2007155825 A | | 6/2007 | |
| JP | 2007327801 A | | 12/2007 | |
| WO | 9913325 A1 | | 3/1999 | |
| WO | 2005048792 A1 | | 6/2005 | |
| WO | 2005111955 A1 | | 11/2005 | |
| WO | 2009033370 A1 | | 3/2009 | |
| WO | WO 2009033101 A1 | * | 3/2009 | ......... G05B 19/0428 |

\* cited by examiner

METHOD AND DEVICE FOR PREPARING BEVERAGES

CROSS-REFERENCE TO RELATED APPLICATIONS

This application is a National Phase Application of PCT International Application No. PCT/IB2011/055317, International Filing Date, Nov. 28, 2011, claiming priority to China Patent Application No. CN2010001913, filed Nov. 29, 2010, each of which is hereby incorporated by reference in its entirety.

BACKGROUND OF THE INVENTION

1. Field of the Invention

The present invention relates generally to a food processor, and more particularly to a beverage preparation device such as a juicer or a blender. The present invention also relates to a method of preparing beverages.

2. Description of the Prior Art

Juicers and blenders are very good kitchen appliances for consumers. A juicer is used for squeezing and extracting juice from fruits (apple, peach, orange, lemon, grape, lime, grapefruit, etc.), vegetables (sweet corn, carrot, celery, cabbage, etc.) and herbs. The pulp is usually discarded. A blender differs from a juicer in that it does not separate the juice from the pulp.

However, currently these beverage preparation devices focus more on the convenience of the design, the robustness of the cutters, the separation of the pulp and the juice, cleaning aspects, while the taste of beverages is a matter that is left entirely to the raw material(s) used. Taste sensation is the most important aspect for consumers. No matter how healthy the beverage is, if consumers cannot stand the final taste sensation, for instance if it is too sour, too bitter, the consumer might refuse to drink it. Even if a recipe mentions to add sugar, honey, it still requires the practical experience of the consumers. And it is very hard for consumers to quickly find the right taste balance. Besides, even if the raw materials are the same type, their taste will still vary, because the production location, the storage method, etc. are different. As a result the consumer will not be confident enough about the taste result. It is even worse if the beverage is served to kids.

Furthermore, at home, the family members have different taste preferences. But current beverage preparation devices can only provide a single taste if the ingredients are the same.

Accordingly, there is a need to improve the current beverage preparation devices in terms of taste management.

SUMMARY OF THE INVENTION

It is an object of the present invention to provide a beverage preparation device that can supply beverages that vary in taste according to the user's desired taste.

To this end, a beverage preparation device is provided, which comprises:
a plurality of storage chambers for storing several ingredients, respectively, each of said several ingredients having a different taste property;
a user interface for receiving data representing a user's preferred taste;
a taste management unit comprising:
a memory for storing a reference table which describes the taste property of each ingredient; and
a processor for determining the dosage of each ingredient to be used according to said reference table and the user's preferred taste, and
a generator for generating a beverage from at least one of said several ingredients according to said determined dosage.

According to an example of the invention, the several ingredients are stored in respective storage chambers manually or automatically.

According to an example of the invention, the beverage preparation device further comprises a module for dividing raw material(s) of the beverage into several ingredients, each of said several ingredients having a different taste property. The module for dividing raw material(s) comprises a cutter for cutting a single raw material into the several ingredients. Preferably, the module for dividing raw material(s) comprises at least one taste sensor by means of which the raw material(s) of the beverage is(are) accurately divided into said several different ingredients. More preferably, the taste sensor is an electronic tongue.

According to an example of the invention, each ingredient may be a single raw material such as a fruit, a vegetable or a food product, or a part of the single raw material.

According to an example of the invention, the taste property is defined by at least one of the degree of sourness, the degree of sweetness, the degree of bitterness and the degree of thickness. The ingredient corresponding to the degree of thickness is water.

According to another example of the invention, the number of storage chambers for storing the ingredients is equivalent to the number of ingredients.

According to still another example of the invention, the user interface includes at least one taste setting unit selected from a group including sourness degree setting unit, sweetness degree setting unit, bitterness degree setting unit and thickness degree setting unit. Each of the taste setting units comprises one or more buttons for receiving the data representing a user's preferred taste.

The present invention also provides a method of preparing beverages by the above-mentioned beverage preparation device, said method comprising the steps of:
dividing raw material(s) of the beverage into several ingredients;
storing said several ingredients in the respective storage chambers;
receiving the data representing a user's preferred taste from the user interface;
determining the dosage of each ingredient to be used according to the reference table and the user's preferred taste; and
generating the beverage from at least one of said several ingredients according to said determined dosage.

Preferably, the step of dividing raw material(s) of the beverage into several ingredients comprises the sub-step of sensing the tastes of the ingredients by at least one taste sensor, which preferably is an electronic tongue.

Other objects, advantages, and novel features of the present invention will be apparent from the following detailed description of preferred embodiments thereof with reference to the attached drawings, in which:

DETAILED DESCRIPTION OF THE PRESENT INVENTION

Figure 1:
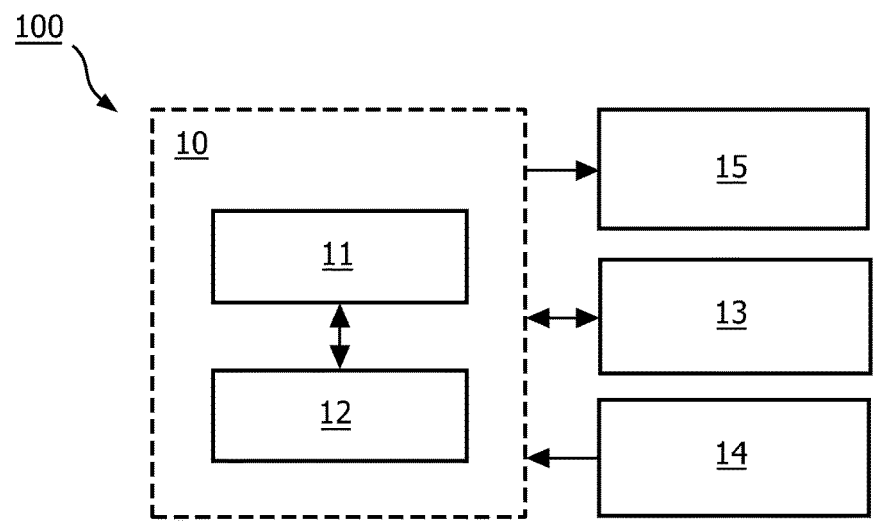
FIG. 1 is a schematic block diagram of a beverage preparation device according to an embodiment of the present invention.

FIG. 1 is a schematic block diagram of a beverage preparation device 100 according to an embodiment of the invention. The beverage preparation device 100 includes a plurality of storage chambers (not shown) for storing several ingredients, respectively, each of said several ingredients having a different taste property; a module 13 for dividing raw material(s) of the beverage into several ingredients, each of said several ingredients having a different taste property; a user interface 14 for receiving data representing a user's preferred taste; a taste management unit 10 and a generator 15 for generating a beverage.

The taste management unit 10 includes a memory 11 for storing a reference table which describes the taste property of each ingredient and a processor 12 for determining the dosage of each ingredient to be used according to said reference table and the user's preferred taste. The taste management unit 10 and the processor 12 can be implemented by way of software, hardware or firmware. For example, the program codes achieving the functions of the processor 12 are stored in a memory. These codes are loaded and executed by a micro controller unit (MCU). For another example, IC chips can be used as a processor 12. Those skilled in the art could implement embodiments of the invention in various ways.

The generator 15 is used for generating a beverage from said several ingredients according to said determined dosage. The generator 15 may be an assembly that can squeeze, extract, blend and/or stir the ingredients stored in the storage chambers.

The taste property is defined by at least one of the degree of sourness, the degree of sweetness, the degree of bitterness and the degree of thickness. The ingredient corresponding to the degree of thickness is water. The required dosage of water will be automatically fed from a water tank, which will help to adjust the taste of the beverage as well. "Water" here is also regarded as one "ingredient", hence its dosage can also be selected through the user interface.

The number of storage chambers for storing the ingredients is equivalent to the number of the ingredients.

Each ingredient may be a single raw material such as a fruit, a vegetable or a food product, or a part of the single raw material.

The module 13 for dividing raw material(s) comprises a cutter (cutting mechanism) for cutting a single raw material into the several ingredients. The cutting mechanism may include one or more cutting blades, which will perform a similar function as an automatic apple pealing and slicing machine, with the core of the apple dug out. Parameters like cutting depth and cutting angle may be designed according to the user's taste requirement.

The user interface 14 includes at least one taste setting unit selected from a group including the sourness degree setting unit, sweetness degree setting unit, bitterness degree setting unit and thickness degree setting unit. Each of the taste setting units comprises one or more buttons for receiving the data representing the user's preferred taste.

For providing an accurate measurement of the taste of the ingredients, the device 100 may preferably have taste recognition sensors, which will help to manually or automatically divide the raw material(s) into different ingredients and also help to guarantee consistency of the final taste of the beverage. More preferably, the module 13 for dividing raw material(s) comprises at least one taste sensor by means of which the raw material(s) of the beverage is(are) accurately divided into several different ingredients. The taste sensor is preferably an electronic tongue, which is a prior art sensor device for recognition (identification, classification, discrimination), quantitative multi-component analysis and artificial assessment of taste and flavor of various food products. The electronic tongue may, for instance, be available from the University of Illinois at Urbana-Champaign. References, such as U.S. Pat. No. 6,730,201B1 and US published patent application number 2009/0212663A1, disclosing this kind of electronic tongue, are incorporated herein by reference.

Figure 2:
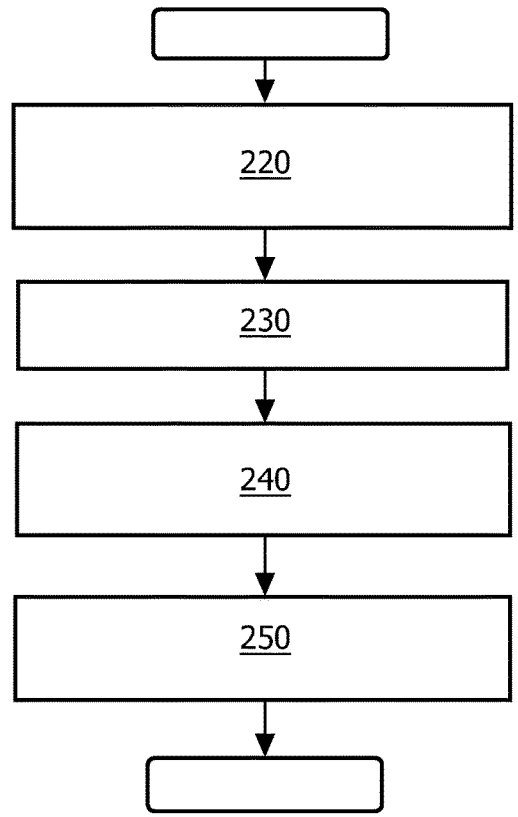
FIG. 2 is a schematic block diagram showing a method of preparing a beverage by the beverage preparation device of FIG. 1.

FIG. 2 is a schematic block diagram showing a method of preparing beverages by the beverage preparation device 100 of FIG. 1. Said method of preparing beverages includes the following steps: dividing raw material(s) of the beverage into several ingredients, each of said several ingredients having a different taste property; and storing said several ingredients in the respective storage chambers (step 220); receiving data representing a user's preferred taste from a user interface (step 230); determining the dosage of each ingredient according to a reference table and the user's preferred taste (step 240); and generating the beverage from at least one of said several ingredients according to the determined dosage (step 250).

Preferably, the step of dividing raw material(s) of the beverage into several ingredients comprises a step of sensing the tastes of the ingredients by at least one taste sensor.

The main advantage of this invention is that the beverage preparation device 100 has a taste management unit 10, which can facilitate users to quickly select or balance a desired taste and can supply different tastes of a beverage. Particularly in a commercial application, the advantage will be more evident.

In order to further explain and elucidate the beverage preparation device 100 according to the present invention and the method of preparing beverages using the same, a description will ge given of two examples to show details of the device and method for preparation of beverages according to the present invention.

EXAMPLE 1

Example 1 of this invention is about handling taste in the case of a single raw material. Apple and orange will be taken as examples hereafter.

The device 100 will have an auto-cutting system which will cut the fruit/vegetable, based on the differently tasting areas of the food product. For instance, the apple is cut into three groups: an outer part group, a body part group and a core part group.

Table 1 below shows the sugariness of some kinds of fruits. It shows that different fruit skin areas (outer skin, middle skin, inner skin) will contribute to a different degree to the taste.

TABLE 1

| Fruit type | Sugariness |
| --- | --- |
| sweet corn | 5 (lower sugariness) |
| strawberry | 6.3 (lower sugariness) |
| pineapple | 9.2 (lower sugariness) |
| Hami melon with skin | 10.5 (middle sugariness) |

TABLE 1-continued

| Fruit type | Sugariness |
| --- | --- |
| red apple without core | 11.3 (middle sugariness) |
| red apple with core | 25.1 (high sugariness) |
| Hami melon without skin | 12.6 (middle sugariness) |
| peach without core | 12.6 (middle sugariness) |
| peach with core | 14.7 (middle sugariness) |
| banana | 18 (high sugariness) |
| watermelon | 18 (high sugariness) |
| grape | 25 (high sugariness) |
| navel Orange | 28 (high sugariness) |

Table 2 below shows the acidity of some kinds of fruits/vegetables. It shows that different kinds of fruits/vegetables will contribute to a different degree to the taste.

TABLE 2

| Fruit/vegetable type | Acidity (PH value) |
| --- | --- |
| lemon | 2.2-3.5 (high acidity) |
| grape | 2.55-4.5 (high acidity) |
| apple | 3.0-5.0 (middle acidity) |
| peach | 3.2-3.9 (middle acidity) |
| pear | 3.2-3.95 (middle acidity) |
| strawberry | 3.8-4.4 (middle acidity) |
| orange | 3.55-4.9 (middle acidity) |
| tomato | 4.1-4.8 (middle acidity) |
| pumpkin | 5 (lower acidity) |
| carrot | 5 (lower acidity) |
| cabbage | 5.2 (lower acidity) |
| spinach | 5.7 (lower acidity) |
| watermelon | 6.0-6.4 (lower acidity) |
| pea | 6.1 (lower acidity) |

Based on the taste shown in tables 1 and 2, we can, for instance, divide fruits/vegetables into the following taste property groups as shown in table 3.

TABLE 3

| Taste Property Group | | | |
| --- | --- | --- | --- |
| sour | | | |
| (pH < 3.0) sweet-sour | | | |
| (3.0 < pH < 5.0) sweet | | | |
| (pH > 5.0) neither sweet nor sour | | | |
| (pH > 5.0, and the sugariness is very low) | | | |
| grapefruit | tomato | watermelon | water |
| pineapple | red apple | melon | spinach |
| lemon | lychee | banana | — |
| green apple | grape | sugarcane | — |
| strawberry | peach | red apple core | — |
| pear core | pear | pawpaw | — |

Comparing different parts of an apple, it is found that:
outer group: sweet and mildly sour; the juice is a bit watery;
body group: extremely sweet; the juice is sticky and juicy; and
core group: very sweet: the juice is juicy.

Since the apple itself contains different taste "ingredients", these taste ingredients can be used to prepare a user's preferred taste. This can be achieved by the following typical steps:
cutting apples into three groups, i.e. outer, body, and core group, wherein each group corresponds to one ingredient, and the blade of the cutter needs to be able to control the depth of cutting;
collecting each ingredient manually or automatically by an ingredient collector and storing them separately in different storage chambers for producing a beverage;
receiving the data representing a user's preferred taste from the user interface;
determining the dosage of each ingredient according to a reference table and the user's preferred taste; and
generating the beverage from said several ingredients according to the determined dosage.

For example, if the preferred taste data selected by the user corresponds to the sweetest taste, only the ingredient having the sweetest taste property will be used to prepare the beverage; if the preferred taste data selected by the user corresponds to half sweet and half bitter, the ingredients having the sweet taste property and the ingredients having the bitter taste property will both be used in equal amounts to prepare the beverage; and if the preferred taste data selected by the user corresponds to half sweet and ¼-bitter, the dosage ratio between the two ingredients respectively having the sweet and bitter taste properties will be 2:1; etc. Water is also used as an ingredient to adjust the thickness of the beverage.

Dividing the raw material(s) into different ingredients may be done manually by consumers or semi-automatically with the help of taste sensors. Taking an apple as an example, it may be manually cut into two groups by a knife, one group comprises the body with the skin and the other group comprises the core with the body. The number of groups depends on the type of fruit. Then, each group will be directly put into the respective storage chamber by hand (manually) or by a mechanism(mechanically or automatically).

Taking an orange as an example, the skin of the orange will be separately peeled and collected in the device as an ingredient having bitterness as a property. The skin of the orange is very nutritional, but the taste is a bit bitter. This method enables people to enjoy the juice from the skin which has a good taste.

In general, for example, the ingredients could be divided into:
sour ingredients;
normal ingredients (not sour, not sweet);
sweet ingredients;
bitter ingredients;
etc.

EXAMPLE 2

Example 2 of this invention is about handling taste for multiple types of raw materials like fruit and vegetables.

When consumers want to prepare a beverage by mixing different kinds of fruits and vegetables, this invention enables each individual fruit to be divided into a certain type of ingredient based on its main taste property. For instance, the green apple could be regarded as belonging to an ingredient with sourness as the main property and a carrot could be regarded as belonging to an ingredient with sweetness as the main property. Of course, each individual fruit or vegetable could also use the above mentioned method to cut them into different ingredients. Then other processing steps are the same as in Example 1 described above.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, number, and arrangement of parts within the principles of the invention to the full extent indicated by the broad general meaning of the terms in which the appended claims are expressed.

In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

We claim:

1. A beverage preparation device comprising:
   a module for dividing raw material(s) of the beverage into said several ingredients;
   a plurality of storage chambers for storing several ingredients, respectively, each of said several ingredients having a different taste property;
   a user interface for receiving data representing a user's preferred taste;
   a taste management unit comprising:
      a memory for storing a reference table which describes the taste property of each ingredient, and
      a processor for determining the dosage of each ingredient to be used according to said reference table and the user's preferred taste;
   a generator for generating a beverage from at least one of said several ingredients according to said determined dosage; and
   wherein at least one of:
      said module for dividing raw material(s) comprises a cutter for cutting a single raw material into said several ingredients, and
      said module for dividing raw material(s) comprises at least one taste sensor by means of which the raw material(s) of the beverage are accurately divided into said several different ingredients.

2. The beverage preparation device according to claim 1, wherein said several ingredients are stored in respective storage chambers manually or mechanically.

3. The beverage preparation device according to claim 1, wherein said taste property is defined by at least one of:
   the degree of sourness;
   the degree of sweetness;
   the degree of bitterness; and
   the degree of thickness.

4. The beverage preparation device according to claim 3, wherein the ingredient corresponding to the degree of thickness is water.

5. The beverage preparation device according to claim 1, wherein the number of storage chambers for storing the ingredients is equivalent to the number of ingredients.

6. The beverage preparation device according to claim 1, wherein the raw material is fruit or vegetables or food products.

7. The beverage preparation device according to claim 1, wherein said user interface includes at least one taste setting unit for receiving the data representing a user's preferred taste.

8. A method of preparing a beverage by means of a beverage preparation device, said method comprising the steps of:
   dividing raw material(s) of the beverage into several ingredients, each of said several ingredients having a different taste property,
   storing said several ingredients in respective storage chambers;
   receiving data representing a user's preferred taste from a user interface;
   determining the dosage of each ingredient to be used according to a reference table and the user's preferred taste;
   generating the beverage from at least one of said several ingredients according to said determined dosage;
   wherein at least one of:
      the step of dividing raw material(s) of the beverage into several ingredients comprises a step of sensing the tastes of the raw material(s) by at least one taste sensor, and
      the step of dividing comprises a step of cutting a single raw material into said several ingredients.

9. The method of preparing a beverage as claimed in claim 8, wherein said taste property is defined by at least one of:
   the degree of sourness;
   the degree of sweetness;
   the degree of bitterness; and
   the degree of thickness.

10. The method of preparing a beverage as claimed in claim 8, wherein said user interface includes at least one taste setting unit receiving the data representing a user's preferred taste.

* * * * *